Figure 1:
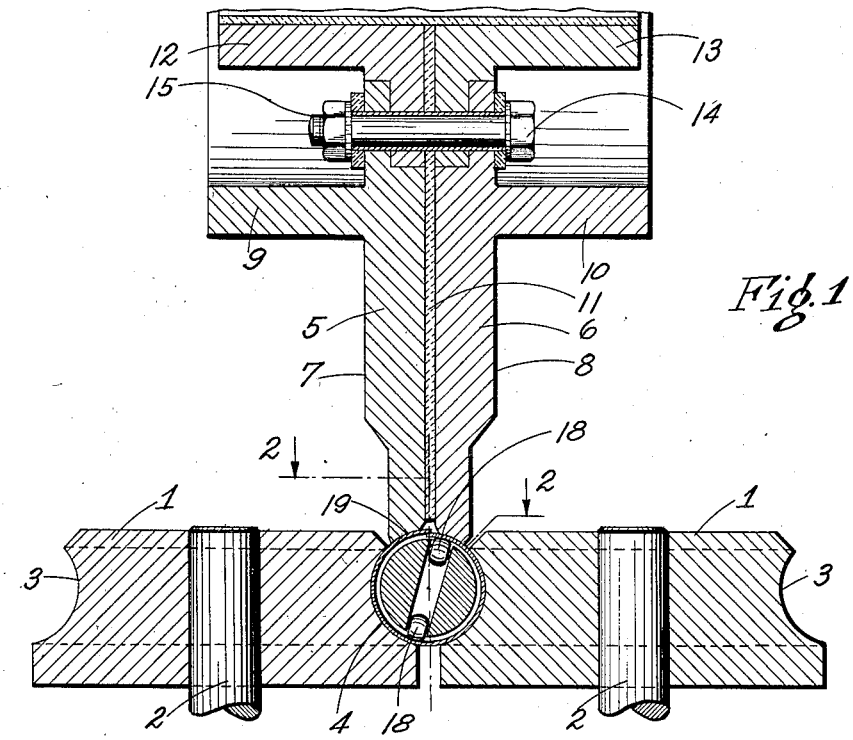

Aug. 15, 1933.    J. GIBSON    1,922,800
APPARATUS FOR WELDING TUBING
Filed Sept. 19, 1930

Inventor
JAMES GIBSON
By Richey & Watts
Attorneys

Patented Aug. 15, 1933

1,922,800

UNITED STATES PATENT OFFICE 1,922,800

APPARATUS FOR LAP WELDING TUBING

James Gibson, Euclid, Ohio, assignor to Steel & Tubes, Inc., Cleveland, Ohio, a Corporation of Ohio Application September 19, 1930
Serial No. 482,985

6 Claims. (Cl. 219—6)

This invention relates to the art of electric resistance welding of metal tubing and more particularly to the lap welding of such tubing.

It has been proposed to make lap-welded tubing by the electric resistance method by the use of an electrical conducting roller inside the tube, this roller co-acting with the corresponding conducting roller or rollers outside the tube to press the two lapping edges together and at the same time cause the welding current to pass through them. When this is done, there is always great danger, by reason of short circuiting the current therethrough, of overheating the interior roller and welding it to the tube or burning and pitting its surface to such extent as to make it useless. If special provision for cooling this interior roller be resorted to, the utility of the apparatus is limited to large size tubing, larger than those sizes which have been used in large quantities. An instance of the procedure here referred to is shown in Patent No. 1,177,726, granted to F. L. Sessions on February 4th, 1916.

In accordance with the present invention, the deficiencies of this proposal are eliminated and thin-wall, lap-welded tubing of all diameters down to a relatively small size may be made in quantity at high speed and with the lapping edges thoroughly and uniformly welded.

The invention involves the use in lap-welding of a welding machine, for example of the general type described in Patent No. 1,388,434 to Johnston, heretofore largely used in butt-welding, but with the addition of roller means located within the tube and serving to support the underlapping edge of the lapped tubing in order to insure the requisite pressure between the lapping edges whereby the welding current will flow freely between them. This roller means is distinctly a supporting and pressure applying roller and not a current-carrying roller. To insure against the roller itself becoming welded to one of the parts with which it contacts, and becoming overheated to the point of burning or pitting its surface, the roller is removed from the point of welding far enough to insure that it will not carry a substantial part of the welding current and therefore will not be overheated, but will not be so far away from the joint to be welded but that it will serve effectively to support the under-lapping edge and thus supply the requisite pressure.

The invention is distinctive in various respects. The lap-welding of tubing is accomplished by a machine having a welding throat formed by electrode-rollers and lateral pressure rollers substantially surrounding the tube, this throat being of the size required to contract the tube blank to the desired size and produce the requisite lapping of the edges. The underlapping edge is supported in sufficiently firm contact with the overlying edge by a supporting roller located inside the tube and held in position by a roller or a series of rollers bearing on the bottom of the tube. This supporting roller for producing the requisite contact of the lapping edges is not a current-carrying roller and performs no function of the welding operation other than in so supporting the underlapping seam edge that the two seam edges will be pressed into contact with the pressure requisite for free flow of the welding current, and the welding together of the heated surfaces. Furthermore, the roller performs no function in positioning the seam edges relatively, the welding throat and the elements feeding the blank into the throat being arranged to do that. The supporting roller is removed laterally from the seam edges enough to insure that no substantial part of the welding current will pass through it and much too far to permit of its use as a seam guide; at the same time it is maintained close enough to the overlapping seam edges to permit it to perform effectively its function of supporting the underlapping edge and insuring the requisite hard contact of the seam edges notwithstanding the downward pressure of one of the electrode rollers upon the wall of the underlapping seam edge. This supporting roller is mounted within the tube at a slight incline to the vertical so that its upper edge contacting with the tube wall is displaced laterally a small amount from the overlapping edges and underlies the electrode roller in contact with that underlapping seam edge.

By this assembly of parts and this distinctive form of internal roller, the continuous production of lap welded tubing is made possible because adequate provision is made for insuring the requisite contact between the lapped seam edges and between the tube walls and the electrode rollers and at the same time the danger of welding, pitting or burning the interior roller is effectively eliminated.

Figure 2:
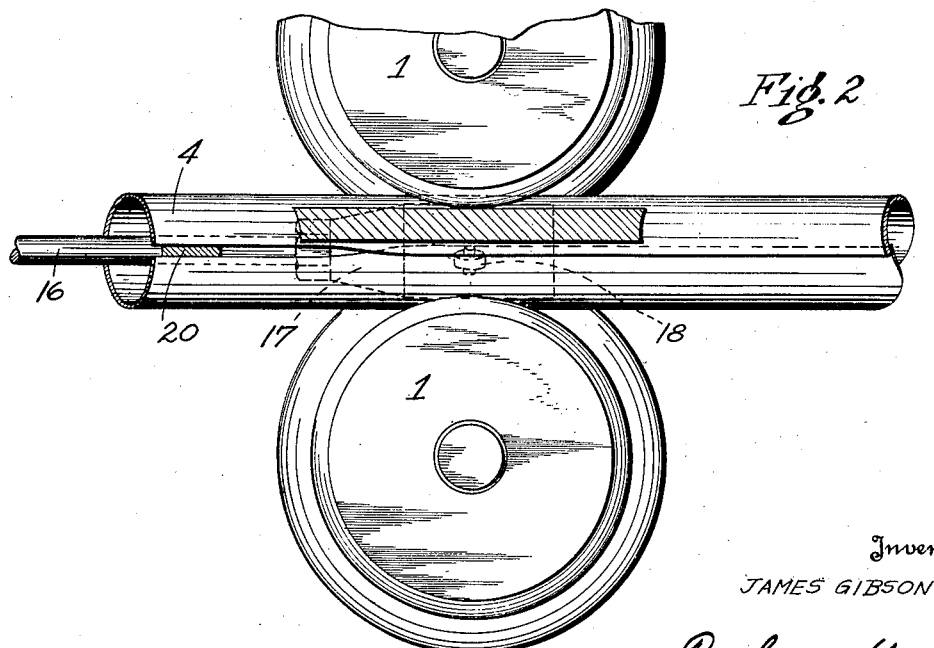

In the drawing accompanying and forming a part of this specification, in which drawing I have illustrated one form of apparatus embodying my invention Figure 1 is a cross sectional view taken vertically through the welding throat of a tube welding machine embodying my invention, and Figure 2 is a top plan view taken substantially on line 2—2 of Figure 1.

In Figure 1 a pair of similar tube pressure rolls 1 are shown each mounted on a vertical axis 2 and each grooved as at 3 to conform substantially to the exterior surface of a tube 4 to be lap-welded. Electrodes 5 and 6 of good electrical conducting material consist of tube contacting rings 7 and 8, respectively provided with cylindrical flanges 9 and 10 to engage with suitable brushes (not shown) to conduct current to the electrodes. The electrodes 5 and 6 are insulated from each other by insulation 11 and are secured to hubs 12 and 13, respectively, which likewise are insulated from each other and from the shaft (not shown) on which the hubs and electrodes are mounted. Suitable means such as bolts 14 and nuts 15 serve to secure the electrodes together and to the hubs and insulation is provided for such securing means.

Within the tube 4 a mandrel rod 16 is positioned to which is attached a mandrel 17 carrying rollers 18 to engage on diametrically opposite interior surfaces of the tube 4. The mandrel 17 is located so that the rollers 18 are disposed at an angle to the vertical so that one roller 18 will engage with the underlapped portion of the tube closely adjacent to the seam cleft but entirely out of contact with the overlapped portion of the tube at the seam cleft.

By reference to Figure 1 it will be noted that the electrodes are provided with tube contacting grooves or surfaces 19 which substantially engage the tube throughout the full width of such surfaces. Preferably the electrode 6 has a slightly greater diameter than electrode 5 to contact with the tube after the adjacent portion of the latter has been lapped under the edge portion on the opposite side of the seam cleft. This difference in diameter of the electrodes amounts to approximately the thickness of the metal being welded.

A seam guide 20 of the conventional form projects into the tube between the opposed seam edges at a point some little distance in front of the welding throat. I have found that good results are obtained if the seam guide is positioned from about 2" to about 4" ahead of the welding throat or center line of the electrodes. Preferably the rollers 18 are disposed approximately on the center line of the electrodes or at the point where the tube reaches its highest temperature and the welding is to take place.

In practicing my invention with apparatus as shown, the substantially circular formed tubing is moved steadily past the seam guide 20 and into and through the welding throat. The electrode 6 contacts the tube at a slightly greater distance in front of the welding throat, that is between the seam guide 20 and the welding throat, than does electrode 5 and serves to depress the seam edge of the metal below the metal on the other side of the seam and hold it in such position as the tube moves between the pressure rolls 3 which force the seam edges into lapped relation to the desired extent, the initial lapping of the seam edges actually occurring slightly in advance of the welding throat, between it and the seam guide.

As the lapped tube reaches the welding throat the current flows from one electrode to the other through the contacting surfaces of the lapped metal and heats the surfaces to welding temperature while the rollers 18 are pressing the underlapped metal against the overlapped metal with welding pressure. The steady movement of the tubing through the welding throat removes the welded seam from the point of application of current before the metal has been unduly heated.

In general the amount of current required for lap-welding metal by this method has been found to be slightly greater than that required, but for butt welding metal of the same gauge and character.

What I claim is:

1. A welding machine comprising means including a pair of electrode rollers to bring edge portions of a tube into lapped relation, means for moving a tube in the direction of its length with the electrode rollers contacting with the exterior of the tube at opposite sides of the seam therein, and a supporting roller located inside the tube in contact with the interior of the underlapped portion of the tube at a point displaced laterally from its edge.

2. A welding machine comprising means including a pair of electrode rollers to bring edge portions of a tube into lapped relation, means for moving a tube in the direction of its length with the electrode rollers contacting with the exterior of the tube at opposite sides of the seam therein, a member located within the tube, a roller mounted on said member and contacting with the interior surface of the underlapped portion of the tube at a point displaced laterally from the edge thereof and a second roller mounted on the said member and contacting with the tube opposite the seam therein to support the first roller in position.

3. Apparatus for lap welding steel tubing which comprises a seam guide for formed butted tubing, a welding throat aligned with and disposed near to the seam guide, the throat including electrically energized electrodes engaging the formed tubing on opposite sides of and close to the seam edges, and serving to press one seam edge of the tubing to below and under the other seam edge in advance of the throat, and means within the tubing at the welding throat to press the underlapped tube portion into welding contact with the overlapped tube portion.

4. Apparatus for lap welding steel tubing which comprises a welding throat including roller electrodes engaging the tubing adjacent to and on opposite sides of the seam, the throat serving to bring the seam edge portions of the tubing into lapped relation to each other, and means within the tubing at the welding throat to press the underlapped edge portion into welding contact with the overlapped edge portion.

5. Apparatus for lap welding steel tubing comprising means including a welding throat substantially surrounding formed tubing in a plane transverse to the axis thereof, and serving to bring the edge portions of the tubing into lapped relation, and means within the tubing at the throat engaging the underlapped portion at a point displaced laterally from the edge thereof for pressing the underlapped portion against the overlapped portion.

6. Apparatus for lap welding steel tubing which comprises a seam guide for formed tubing, a constricted welding throat including substantially parallel electrodes, one electrode being of slightly greater diameter than the other, and means within the tube supporting and engaging the underlapped portion of the tubing at a point displaced laterally from the edge thereof.

JAMES GIBSON.